US009973982B1

(12) United States Patent
Oroskar et al.

(10) Patent No.: US 9,973,982 B1
(45) Date of Patent: *May 15, 2018

(54) CONTROLLING REVERSE-DIRECTION NEIGHBOR REPORTS BASED ON THE CHARACTERISTICS OF QUEUED BEARER TRAFFIC

(71) Applicant: Sprint Spectrum L.P., Overland Park, KS (US)

(72) Inventors: Siddharth S. Oroskar, Overland Park, KS (US); Jasinder P. Singh, Olathe, KS (US); Maulik K. Shah, Austin, TX (US)

(73) Assignee: Sprint Spectrum L.P., Overland Park, KS (US)

( * ) Notice: Subject to any disclaimer, the term of this patent is extended or adjusted under 35 U.S.C. 154(b) by 116 days.

This patent is subject to a terminal disclaimer.

(21) Appl. No.: 15/061,158

(22) Filed: Mar. 4, 2016

Related U.S. Application Data

(63) Continuation of application No. 14/223,514, filed on Mar. 24, 2014, now Pat. No. 9,307,458.

(51) Int. Cl.
*H04W 36/00* (2009.01)
*H04W 72/04* (2009.01)
*H04L 12/26* (2006.01)
*H04W 72/10* (2009.01)
*H04W 28/10* (2009.01)

(52) U.S. Cl.
CPC ......... *H04W 36/0061* (2013.01); *H04L 43/16* (2013.01); *H04W 72/0446* (2013.01); *H04W 72/10* (2013.01)

(58) Field of Classification Search
None
See application file for complete search history.

(56) References Cited

U.S. PATENT DOCUMENTS 7,499,700 B2  3/2009  Dillon et al.
8,112,083 B1  2/2012  Sigg et al.
(Continued)

FOREIGN PATENT DOCUMENTS

WO  2012/014604  2/2012
WO  2013/172753  11/2013

OTHER PUBLICATIONS

"Automatic Neighbour Relation in LTE," LteWorld, Apr. 20, 2010, 4 pages, http://lteworld.org/blog/automatic-neighbour-relation-lte.
(Continued)

*Primary Examiner* — Eunsook Choi

(57) ABSTRACT

A wireless communication device (WCD) may determine that the WCD has bearer traffic queued for transmission to a radio access network (RAN). The WCD may be configured to transmit the bearer traffic and neighbor reports over a reverse-direction channel of the RAN. The neighbor reports may contain information related to wireless coverage areas. One or more characteristics of the bearer traffic may also be determined. Based on the one or more characteristics of the bearer traffic, the neighbor reports may be scheduled to be transmitted over the reverse-direction channel at a particular rate. The WCD may transmit the neighbor reports over the reverse-direction channel at the particular rate.

20 Claims, 6 Drawing Sheets

(56) References Cited

U.S. PATENT DOCUMENTS

| | | |
|---|---|---|
| 8,279,799 B1 | 10/2012 | Sarkar et al. |
| 2005/0107110 A1 | 5/2005 | Vasudevan et al. |
| 2006/0182065 A1* | 8/2006 | Petrovic .................. H04L 47/12 370/332 |
| 2006/0209767 A1 | 9/2006 | Chae et al. |
| 2007/0287460 A1 | 12/2007 | Koo |
| 2008/0293423 A1 | 11/2008 | Park et al. |
| 2009/0163223 A1* | 6/2009 | Casey .................... H04W 36/22 455/453 |
| 2012/0003943 A1 | 1/2012 | Marinier et al. |
| 2012/0275315 A1 | 11/2012 | Schlangen et al. |
| 2013/0295938 A1 | 11/2013 | Yamine |
| 2014/0073306 A1 | 3/2014 | Shetty et al. |
| 2014/0286295 A1* | 9/2014 | Liu ........................ H04W 72/10 370/329 |
| 2015/0024753 A1 | 1/2015 | Palenius et al. |

OTHER PUBLICATIONS

Dahlen, Anders, et al. "Evaluations of LTE Automatic Neighbor Relations," Vehicular Technology Conference (VTC Spring), 2011 IEEE 73rd. IEEE, 2011, pp. 1-5.

\* cited by examiner

CONTROLLING REVERSE-DIRECTION NEIGHBOR REPORTS BASED ON THE CHARACTERISTICS OF QUEUED BEARER TRAFFIC

CROSS-REFERENCE TO RELATED APPLICATION

This application claims priority to U.S. patent application Ser. No. 14/223,514, filed Mar. 24, 2014, which is hereby incorporated by reference in its entirety.

BACKGROUND

In wireless networks, wireless communication devices (WCDs) may transmit various types of neighbor reports to a radio access network (RAN) via a reverse-direction (uplink) channel. These neighbor reports may be transmitted periodically or aperiodically. The WCD may also use the reverse-direction channel to transmit bearer traffic to the RAN. In situations where the volume of the neighbor reports is significant, the transmission of bearer traffic may be impacted.

OVERVIEW

It is often beneficial for a WCD to be able to hand over between various wireless coverage areas of a wireless network. As the WCD moves about, or as wireless conditions between the WCD and the RAN change, the WCD may determine that the coverage it is obtaining from its serving wireless coverage area is likely to be too weak to meet the WCD's needs.

The WCD may detect one or more neighboring wireless coverage areas that may be able to provide sufficient coverage. The WCD may report, to the RAN, the existence of these wireless coverage areas and/or the respective strengths at which the WCD receives signals from these wireless coverage areas. Based on these neighbor reports, the RAN and/or the WCD may perform handover procedures such that the WCD obtains a new serving wireless coverage area. In this way, the WCD may be able to maintain a reasonably consistent extent of wireless coverage, which is likely to afford the WCD reasonably consistent data rates as well.

The neighbor reports that the WCD transmits to the RAN may be considered to be signaling traffic, while the application data that the WCD transmits to the RAN may be considered to be bearer traffic. In some embodiments, signaling traffic may consist of data that the WCD and RAN exchange in order to establish, maintain, and/or manage communication with one another, while the bearer traffic may be traffic generated by and provided to end-user applications such as voice, video, email, web, gaming, and social networking applications. However, the distinction between signaling and bearer traffic need not be this rigid, and some applications may support both types of traffic, for example.

In some cases, the RAN may divide the capacity of its forward-direction (downlink) and reverse-direction (uplink) air interfaces into logical channels. Some of these channels may be dedicated for the transport of signaling traffic (signaling channels), while others may be dedicated to the transport of bearer traffic (bearer channels). In general, the data rates required by signaling traffic are less than those required by bearer traffic, so relatively little air interface capacity may be dedicated to signaling traffic.

In the case of the aforementioned neighbor reports, however, this arrangement can be problematic. Since wireless coverage areas can be densely provisioned, any given WCD might receive signals from anywhere from one to several dozen or more wireless coverage areas. Thus, the neighbor reports that the WCD transmits to the RAN might contain information regarding each of these wireless coverage areas, and therefore may be quite lengthy. As a consequence, the WCD may be configured to take advantage of the greater capacity of the bearer channels by transmitting neighbor reports on a bearer channel rather than a signaling channel.

However, this practice may lead to a further disadvantage, in that the WCD's neighbor reports may share the bearer channel's capacity with the WCD's bearer traffic. If the WCD has a large extent of bearer traffic queued, or if this bearer traffic is high priority or delay sensitive, transmission of the neighbor reports may have a deleterious impact on the performance of WCD applications. As a result, it may be beneficial for the WCD to, based on one or more characteristics of queued bearer traffic, adjust the rate of neighbor reports that it transmits on a channel that also carries bearer traffic.

Accordingly, in a first example embodiment, a WCD may determine that the WCD has bearer traffic queued for transmission to a RAN. The WCD may be configured to transmit the bearer traffic and neighbor reports over a reverse-direction channel of the RAN. The neighbor reports may contain information related to wireless coverage areas. One or more characteristics of the bearer traffic may also be determined. Based on these characteristics of the bearer traffic, the neighbor reports may be scheduled to be transmitted over the reverse-direction channel at a particular rate. The WCD may transmit the neighbor reports over the reverse-direction channel at the particular rate.

A second example embodiment may include a non-transitory, computer-readable storage medium, having stored thereon program instructions that, upon execution by a computing device, cause the computing device to perform operations in accordance with the first example embodiment.

A third example embodiment may include a computing device, involving at least a processor and data storage. The data storage may include program instructions that, when executed by the processor, cause the computing device to perform operations in accordance with the first example embodiment.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

1. Example Wireless Communication System

Figure 1:
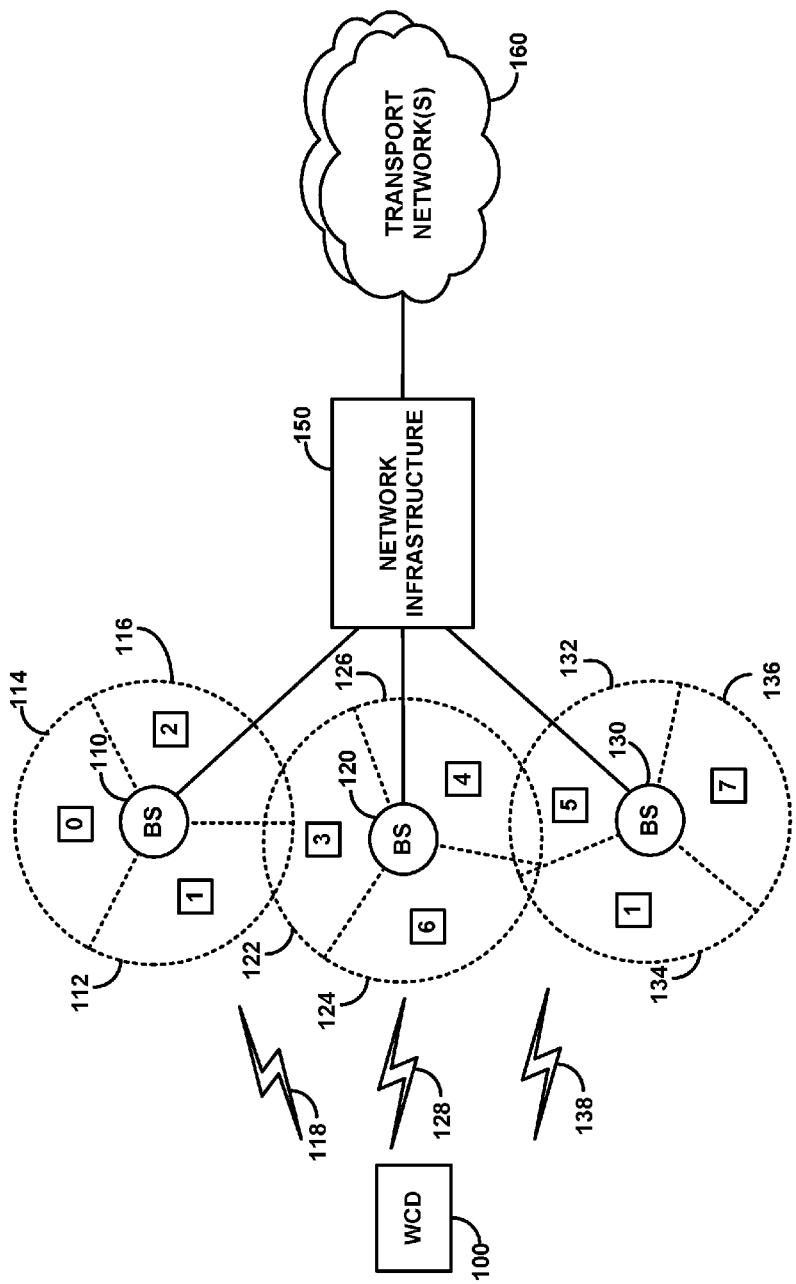
FIG. 1 is a block diagram of a wireless communication system, in accordance with an example embodiment.

FIG. 1 is a block diagram of an example wireless communication system. In FIG. 1, each base station is shown radiating to define one or more wireless coverage areas, each of which may operate on a particular frequency band for instance. In particular, base station 110 is shown radiating to define wireless coverage areas 112, 114, and 116, base station 120 is shown radiating to define wireless coverage areas 122, 124, and 126, and base station 130 is shown radiating to define wireless coverage areas 132, 134, and 136.

The illustrated communication system may operate in accordance with a particular radio access technology such as code-division multiple access (CDMA) and/or Long Term Evolution (LTE). By way of example, the system may be an LTE RAN, in which case each base station may be an LTE eNodeB, and the supporting network infrastructure may include elements such as a mobility management entity (MME), serving gateway (SGW) and a packet data network gateway (PGW). As another example, the system may be a CDMA RAN, in which case each base station may be a CDMA base station known as a base transceiver station (BTS), and the supporting network infrastructure may include elements such as a base station controller (BSC), radio network controller (RNC), mobile switching center (MSC), and packet data serving node (PDSN). Other examples are possible as well.

FIG. 1 further depicts an example WCD 100 positioned in range of air interface communication with base station 110, base station 120, and base station 130. WCD 100 may receive wireless service from one or more of base station 110, 120, or 130 and may thereby communicate with various remote network entities or with other mobile terminals via network infrastructure 150 and perhaps via one or more transport networks 160.

In operation, each wireless coverage area in the example communication system may radiate to define an air interface. The air interface may include a forward-direction link (downlink) for carrying communications from the serving base station to served WCDs, and a reverse-direction link (uplink) for carrying communications from served WCDs to the serving base station. FIG. 1 shows air interfaces 118, 128, and 138 of wireless coverage areas 112, 124, and 134, respectively. Each of air interface 118, 128, and 138 may include a forward-direction link and a reverse-direction link for communicating with WCD 100. Depending on the radio access technology, these air interface links may take various forms and may define various channels for carrying particular data, such as signaling data and bearer traffic for instance.

By way of example, each wireless coverage area may define a pilot channel or reference channel on which the base station may broadcast a pilot signal or reference signal. WCD 100 may detect these signals as indications of wireless coverage, and may measure these signals to determine wireless coverage strength. Further, each wireless coverage area may define one or more signaling channels that carry various overhead messages, such as system information blocks or the like, specifying characteristics and operational parameters of the wireless coverage area, and perhaps information related to other wireless coverage areas.

Each wireless coverage area may also have a respective wireless coverage area identifier, such as a Physical Cell ID (PCI) or a pseudo-noise (PN) offset. In FIG. 1, for instance, wireless coverage areas 112, 114, and 116 provided by base station 110 have identifiers 1, 0, and 2, respectively. Wireless coverage areas 122, 124, and 126 provided by base station 120 have identifiers 3, 6, and 4, respectively. Wireless coverage areas 132, 134, and 136 have identifiers 5, 1, and 7, respectively. Note that some identifiers may be reused between two or more base stations.

Each wireless coverage area identifier may be indicated to WCDs and other base stations by the pilot or reference signal of the respective wireless coverage area, or specified in another overhead broadcast message or signal. The wireless service provider may, for example, assign each wireless coverage area identifier when the wireless coverage area is installed. The wireless service provider may re-assign wireless coverage area identifiers on occasion, such as when additional wireless coverage areas are added to the network.

When a WCD first powers on or enters into the RAN's wireless coverage, the WCD may scan for pilot or reference signals and determine a signal strength for each detected signal (e.g., a received strength or signal-to-noise ratio). The WCD may determine a wireless coverage area providing the strongest pilot or reference signal, and may engage in a process to register with the network by transmitting an attach request (registration request) to the base station that is providing that signal. In one instance, WCD 100 may identify wireless coverage area 124 as providing the strongest pilot or reference signal and may then transmit an attach request to base station 120.

At the time of attachment or thereafter, a WCD may also engage in signaling with the base station to enter into a connected mode. In the connected mode, the base station has provisioned a radio link connection for use by the WCD, over which the WCD can engage in bearer communication with the base station and thereby with various other entities. In that mode, for instance, the WCD may engage in packet data communications on the Internet and/or a voice call on the publicly-switched telephone network (PSTN). This configuration may be referred to as the WCD receiving wireless service from the base station.

While in the connected mode, the WCD may then continue to regularly scan pilot or reference signals, from both the wireless coverage area serving the WCD and from various other wireless coverage areas. Alternatively or additionally, the base station may direct the WCD to engage in such scanning from time to time. As the WCD carries out this scanning, the WCD may thus again determine the signal strength of various wireless coverage areas, and the identities of those wireless coverage areas. For example, while connected to wireless coverage area 134, WCD 100 may determine the signal strength of wireless coverage areas 112 and 124, among others.

Further, while in the connected mode, the WCD may from time to time transmit to its serving base station a measurement report that specifies the signal strength of each wireless coverage area detected by the WCD. In particular, the measurement report may specify each detected wireless coverage area (e.g., by wireless coverage area identifier) and the signal strength (e.g., reference signal receive strength, or signal-to-noise ratio) of the wireless coverage area as determined by the WCD. In practice, a given measurement report may thus include such information for the WCD's currently serving wireless coverage area and may also include such information for each of one or more other wireless coverage areas detected by the WCD.

If such a measurement report specifies a signal strength of another wireless coverage area, the base station or other network node may engage in a process to decide whether to trigger handover of the WCD to the other wireless coverage area (sometimes referred to as a target wireless coverage area). In general, this process may involve evaluating the reported signal strength of the other wireless coverage area to determine whether it is sufficiently strong to support the WCD, and/or whether it is sufficiently stronger than the reported signal strength of the serving wireless coverage area. Further, the process may involve consideration of other factors as well, such as base station load and backhaul capacity for instance.

If the serving base station decides to trigger handover of the WCD to a target wireless coverage area of another base station, the serving base station may then reference its neighbor relations table (NRT) of nearby wireless coverage areas. The NRT may include indicators (e.g., PCIs) of nearby wireless coverage areas. For each wireless coverage area in the NRT, the NRT may also include an address, such as an IP address, for the base station that defines the wireless coverage area. In this way, a base station or other RAN component, and/or a WCD, may be able to determine how to communicate with a base station that defines a particular wireless coverage area.

For instance, the serving base station may find, in the NRT, a particular wireless coverage area having a matching identifier to the target wireless coverage area. Next, the serving base station may transmit to that other base station, either over a direct inter-base-station interface or through one or more other network entities, a handover request message that requests the other base station to provide service to the WCD via the target wireless coverage area. The handover request message may specify the target wireless coverage area using that wireless coverage area's identifier. The other base station may then engage in a handover preparation process to establish a radio link for the WCD, and the WCD may ultimately transition to be served by that other base station.

In general, the procedures used by the WCD and RAN to inform the RAN of wireless coverage areas detected by the WCD and/or the strength at which the WCD receives signals from these wireless coverage areas may be referred to as neighbor relations. Neighbor relations may involve a WCD transmitting one or more distinct types of neighbor reports to the RAN. Examples embodiments involving various types of neighbor report procedures are described below.

Figure 2:
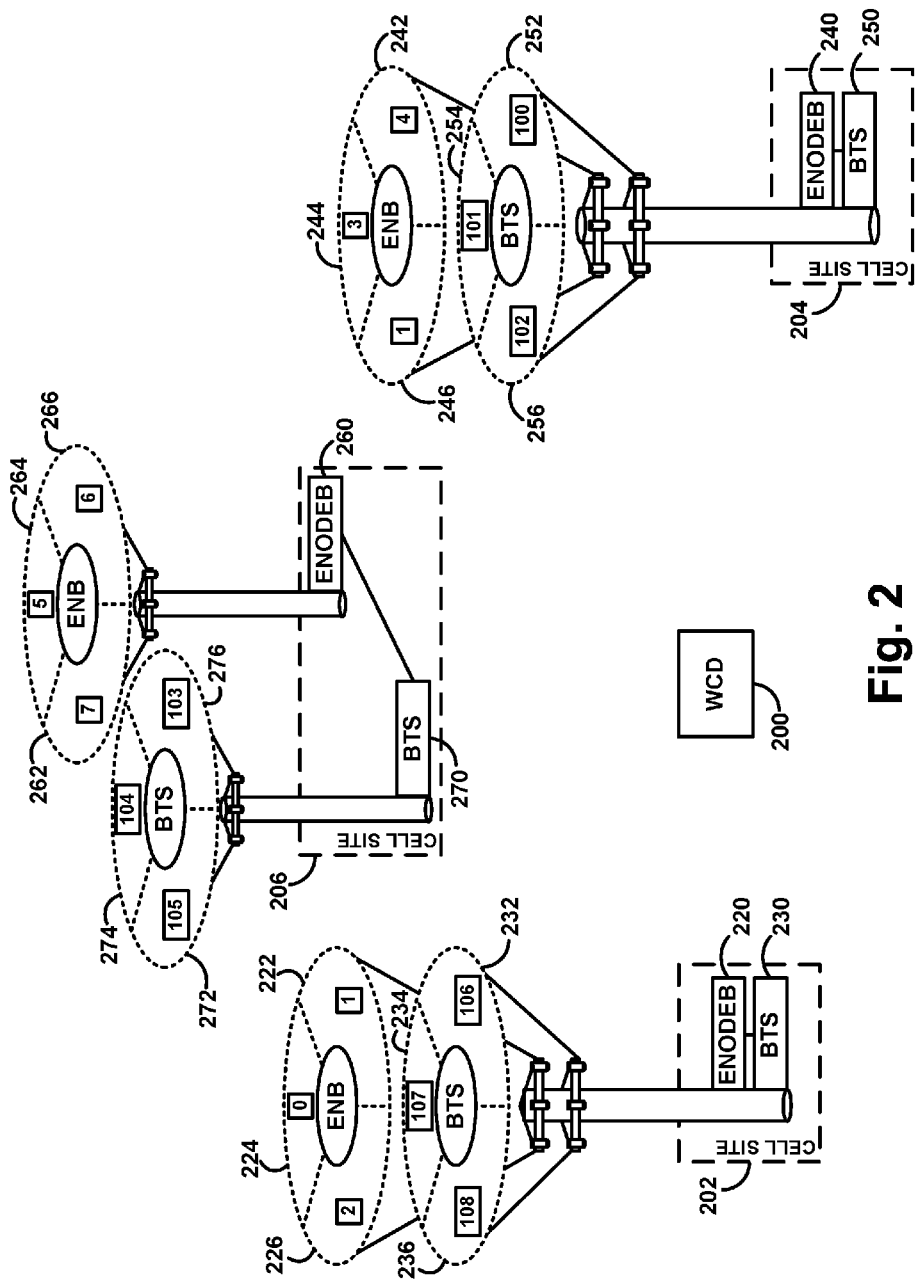
FIG. 2 is a block diagram of various types RAN components, in accordance with an example embodiment.

FIG. 2 is a simplified block diagram of an example communication system in which the present method can be implemented. The example communication system may provide wireless service within a market area. Within the example communication system, components of both an LTE RAN and a CDMA RAN are shown. While an LTE RAN and a CDMA RAN are shown for the purpose of example and explanation, the present method may be implemented using any one or more RANs. For example, the present method may be implemented in a market area in which a wireless service provider operates an LTE RAN and a GSM RAN. Moreover, the present method may be implemented using a RAN that operates according to one or more other radio access technologies that have yet to be developed.

As shown in FIG. 2, the LTE RAN includes at least eNodeB 220, 240, and 260. ENodeB 220 radiates to provide LTE wireless coverage areas 222, 224, and 226, eNodeB 240 radiates to provide LTE wireless coverage areas 242, 244, and 246, and eNodeB 260 radiates to provide LTE wireless coverage areas 262, 264, and 266. Further, the LTE RAN may include additional components not shown such as the network infrastructure shown in FIG. 1.

The CDMA RAN includes at least base transceiver stations (BTS) 230, 250, and 270. BTS 230 radiates to provide CDMA wireless coverage areas 232, 234, and 236, BTS 250 radiates to provide CDMA wireless coverage areas 252, 254, and 256, and BTS 270 radiates to provide CDMA wireless coverage areas 272, 274, and 276. Further, the CDMA RAN may include additional components not shown.

WCD 200 may operate within the range of these base stations. To receive wireless service, WCD 200 may engage in air interface communication with one or more of eNodeB 220, 240, and 260 of the LTE RAN. WCD 200 may also engage in air interface communication with one or more of BTS 230, 250, and 270 of the CDMA RAN. Air interface communication with components of the LTE RAN may occur concurrently with air interface communication with components of the CDMA RAN, or may occur separately.

Components of a communication system may be co-located and/or integrated together in various ways. For example, as a wireless service provider builds out an LTE RAN in the same market area as a CDMA RAN, LTE eNodeBs may be co-located with CDMA BTSs. For instance, in FIG. 2, eNodeBs of the LTE RAN are shown co-located with BTSs of the CDMA RAN at cell sites. Particularly, eNodeB 220 and BTS 230 are co-located at cell site 202 and share the same tower structure, as shown. ENodeB 240 and BTS 250 are co-located at cell site 204 and also share the same tower structure. ENodeB 260 and BTS 270 are co-located at cell site 204 and are shown having separate tower structures. Further, pairs of co-located base stations, such as eNodeB 220 and BTS 230, may share additional infrastructure, such as network infrastructure 150 as shown in FIG. 1.

In general, the depictions of FIGS. 1 and 2 are illustrative. Therefore, in a RAN, there could be more or fewer of each element than is shown, and some elements may be omitted altogether. Additionally, other types of elements not shown may be present. Further, any of these elements may be combined with one another, physically or logically, or distributed across multiple physical devices. Thus, the particular arrangements shown in FIGS. 1 and 2 should not be viewed as limiting with respect to the present invention.

Moreover, the arrangement of the depicted wireless communication system, and the processes described herein, are set forth herein for purposes of example only. Other arrangements and elements (e.g., machines, interfaces, functions, orders of elements, etc.) can be added or used instead, and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

2. Example Computing Device

Figure 3:
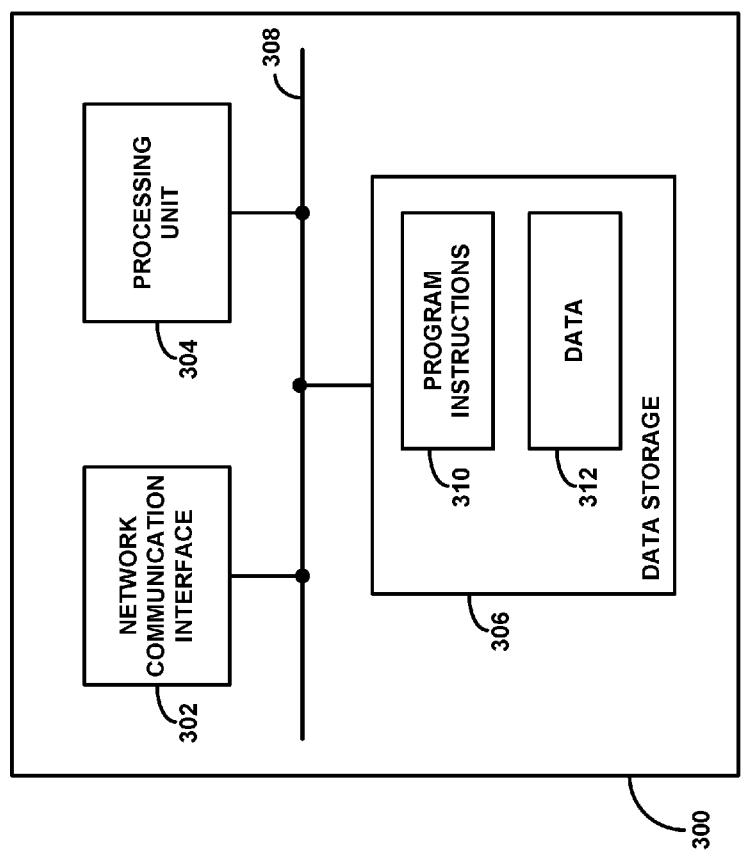
FIG. 3 is a block diagram of a computing device, in accordance with an example embodiment.

FIG. 3 is a block diagram of an example computing device 300. Computing device 300 could be a standalone general purpose or specialized computing device. Alternatively, computing device 300 could be a WCD or part of a RAN, such as a base station, serving gateway, packet gateway, or some other type of RAN component or computer.

As shown, computing device 300 includes a network communication interface 302, a processing unit 304, and data storage 306, all of which may be communicatively linked together by a system bus, network, or other connection mechanism 308. Computing device 300 may also include additional components, functions and/or interfaces not shown in FIG. 3, such as a keyboard, a mouse, a touch screen, a monitor, a printer, and/or one or more ports that interface with such devices, for example a universal serial bus (USB) or high-definition multimedia interface (HDMI) port.

Network communication interface 302 may support communication with various other network entities, such as any of the network entities shown in FIG. 1 or 2. As such, the interface 302 may include one or more network interface modules, such as Ethernet, Wifi, BLUETOOTH®, and/or wide-area wireless connection network interface modules, or any other type of wired and/or wireless communication interfaces.

Processing unit 304 may comprise one or more general purpose processors (e.g., microprocessors) and/or one or more special purpose processors (e.g., application specific integrated circuits, digital signal processors, and/or network processors). Data storage 306 may comprise one or more volatile and/or non-volatile non-transitory storage components, such as optical, magnetic, or flash storage, and may be integrated in whole or in part with processing unit 304.

As shown, data storage 306 may hold program instructions 310 and data 312. Program instructions 310 may be executable by processing unit 304 to carry out various functions described herein and/or depicted in the accompanying drawings. Data 312 could be any data that is generated, received, stored, or used in connection with carrying out such functions.

3. Example Neighbor Report Procedures

For purposes of illustration, this section describes several examples of neighbor reports and the procedures that WCDs and/or RAN components may engage in while exchanging neighbor information. The embodiments described herein are generally directed to LTE systems, but the same or similar embodiments may exist for other types of wireless technologies, such as CDMA or Wifi.

In order to facilitate handovers and/or for other purposes, each base station may be provisioned with an NRT. Each entry of an NRT may include the respective PCIs of source and target wireless coverage areas. The presence of such an entry indicates that the base station (e.g., eNodeB) controlling the source wireless coverage area is aware of the PCI of the target wireless coverage area. In this way, the base station can facilitate a handover of a WCD from the source wireless coverage area to the target wireless coverage area.

Manually provisioning NRTs in a wireless network can be a challenging task. As wireless coverage improves, the number of base stations and wireless coverage areas in a given geographical area tends to grow. Further, in some geographical areas, multiple wireless technologies may exist, and inter-technology handover may take place. For instance, when deploying LTE in a legacy CDMA market, the LTE eNodeBs may be provisioned not only with the PCIs of neighboring source and target LTE wireless coverage areas, but also with similar information regarding neighboring CDMA wireless coverage areas. As a result, manually provisioning an NRT may be time consuming and error prone.

One possible improvement is to allow automatic neighbor relations (ANR) in base stations. With ANR activated, the base stations may automatically add and/or remove entries from their respective NRTs. In some embodiments, these functions may be implementation-specific, with different eNodeB vendors employing different techniques and thresholds in order to determine when to add or remove entries.

As one possible example, WCDs may periodically or from time to time transmit ANR reports to the RAN. The RAN may instruct the WCD when to do so, and/or the WCD may decide on its own when these reports are to be transmitted. For instance, when the WCD detects a signal with a strength of −108 dB or more from a particular wireless coverage area, the WCD may add the PCI of that wireless coverage area to its ANR reports. Should this signal strength later drop below −108 dB, the WCD may remove the PCI from its ANR reports.

Each ANR report may include a list of PCIs, and possibly signal strengths associated with each PCI. The presence of a particular PCI in an ANR report may indicate that the WCD is receiving, or has recently received, signals (e.g., pilot signals or reference signals) from the PCI. Further, the ANR report may also include respective strengths at which the WCD received signals from each PCI.

The RAN may then determine whether to add an entry to the NRT of the WCD's serving eNodeB. For example, suppose that the WCD is served by a wireless coverage area with a PCI of A ("PCI A"). Suppose further that the WCD transmits an ANR report indicating that the WCD received signals from PCIs B, C, and D. The RAN may then automatically add entries for PCI A and PCI B, PCI A and PCI C, and PCI A and PCI D, to the NRT of the eNodeB that defines PCI A. These entries indicate that when PCI A is the source wireless coverage area, WCDs served by PCI A can be handed off to any of the target wireless coverage areas PCI B, C, or D.

In some cases, the RAN may consider the signal strengths associated with each of the target wireless coverage areas when determining whether to add entries to the NRT based also on these signal strengths. For instance, if the WCD reports high signal strengths from PCI B and PCI D, but a low signal strength from PCI C, the entry involving PCI A and PCI C might not be added to the NRT. Whether a signal strength is considered sufficiently high or low for these purposes may be based on one or more threshold signal strengths. If the strength at which the WCD receives signals from the wireless coverage area is at or above such a threshold signal strength, the RAN may add the PCI of the wireless coverage area to the NRT as a target wireless coverage area. If the strength at which the WCD receives signals from the wireless coverage area is below the threshold signal strength, the RAN might not add the PCI of the wireless coverage area to the NRT. In this way, the NRT of each base station may grow automatically based on neighboring wireless coverage areas detected by WCDs.

The RAN may also automatically determine when to remove entries from the NRT. For instance, suppose that an eNodeB that defines PCI A contains an NRT entry relating source wireless coverage area PCI A to destination wireless coverage area PCI B. If the RAN does not receive an ANR report containing PCI B from any WCDs served by PCI A for a period of time, the RAN may remove the NRT entry from the eNodeB that defines PCI A. Alternatively or additionally, if the RAN does receive one or more such ANR reports, but the signal strength(s) for PCI B indicated by these ANR report(s) are below the signal strength threshold, the RAN may remove the NRT entry from the eNodeB that defines PCI A. Thus, when a potential target wireless coverage area is removed from service or configured in such a way that its coverage is weak for WCDs served by a particular source wireless coverage area, entries involving this target wireless coverage area may be removed from the NRT of the base station that defines the source wireless coverage area.

In addition to or as an alternative to ANR reports, a WCD may periodically or from time to time transmit measurement reports to its serving base station. Each entry in a measurement report may specify the PCI of a wireless coverage area as well as the strength at which the WCD receives signals from that wireless coverage area. For instance, when the WCD detects a signal with a strength of −110 dB or more from a particular wireless coverage area, the WCD may add the PCI of that wireless coverage area to its measurement reports. Should this signal strength later drop below −110 dB, the WCD may remove the PCI from its measurement reports.

The measured signal strength may be reported in units of received signal strength or signal-to-noise ratio, for instance, of the wireless coverage area's pilot signal or reference signal. A given measurement report may include such information for one or more wireless coverage areas. For instance, the WCD may include in the report all wireless coverage areas from which it receives a signal, or all wireless coverage areas from which it receives a signal above a threshold signal strength. In some cases, the RAN may transmit a list of wireless coverage areas (e.g., a list of PCIs) to the WCD, and the WCD may include, in the report, only information regarding the wireless coverage areas in the list.

The frequency at which a WCD transmits ANR reports and/or measurement reports may be determined by the RAN, the WCD, or both. For instance, the RAN might instruct the WCD to transmit ANR reports at a particular frequency, and measurement reports at a different frequency. Based on its configuration, and possibly other factors, the WCD may transmit these reports at the provided frequencies, or may select different frequencies so that one or both of these reports are transmitted more or less frequently, or at non-periodic intervals.

The transmission of a neighbor report from a WCD to a RAN may follow the WCD taking measurements that are to be reported in the measurement report. Thus, for example, if the WCD is instructed by the RAN to transmit a particular type of neighbor report once every 120 seconds, the WCD may attempt to detect the appropriate PCIs and/or measure the appropriate signal strengths every 120 seconds and report these measurements to the RAN. Alternatively, the WCD may perform the detection and measuring functions more or less frequently than the WCD reports the results of these functions to the RAN.

As noted above, a WCD might receive signals from anywhere from one to several dozen or more wireless coverage areas. Thus, the neighbor reports that the WCD transmits to the RAN might contain information regarding each of these wireless coverage areas, and therefore may be quite lengthy. As a consequence, the WCD may be configured to use a bearer channel, rather than or in addition to a signaling channel, to transmit these reports.

However, this may lead to neighbor reports sharing the bearer channel's capacity with the WCD's bearer traffic. If the WCD has a large amount of bearer traffic queued, or if this bearer traffic is high priority or delay sensitive, transmission of the neighbor reports may have a deleterious impact on the performance of WCD applications. As a result, it may be beneficial for the WCD to, based on the one or more characteristics of queued bearer traffic, adjust the frequency at which it transmits neighbor reports.

The one or more characteristics may include, for example, one or more quantitative characteristics, such as an amount of bearer traffic. Alternatively or additionally, the one or more characteristics may include one or more qualitative characteristics, such as a priority or a delay sensitivity of the delay traffic.

Figure 4A:
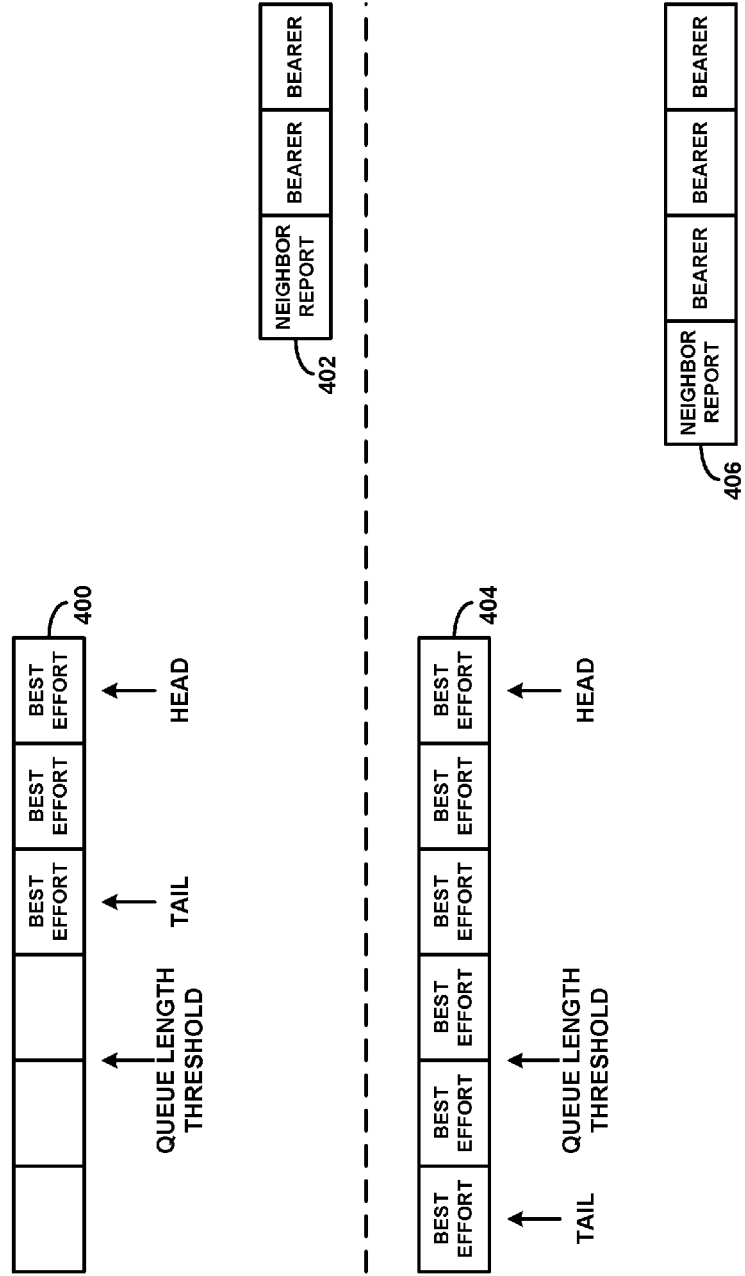
FIG. 4A depicts queued traffic and associated transmission schedules, in accordance with an example embodiment.
Figure 4B:
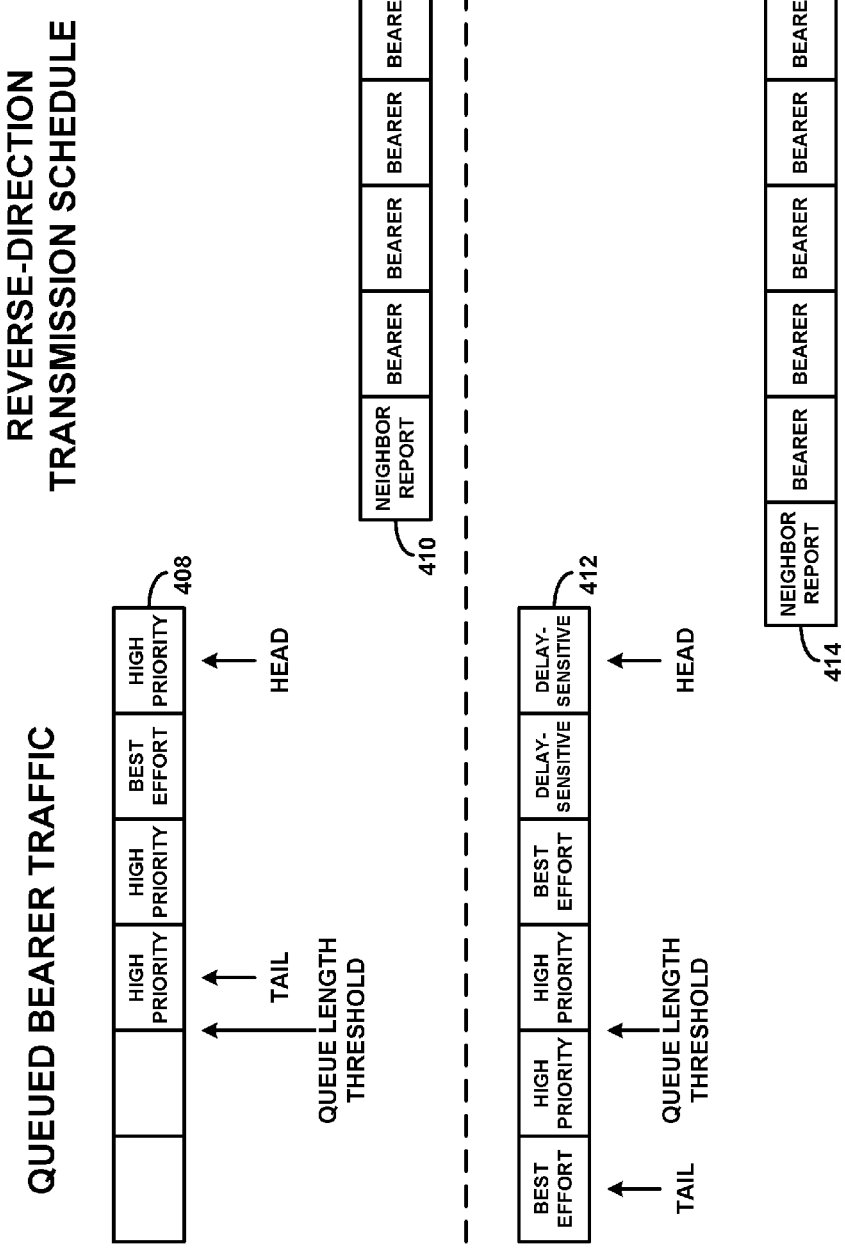
FIG. 4B also depicts queued traffic and associated transmission schedules, in accordance with an example embodiment.

FIGS. 4A and 4B depict various examples of how a WCD might dynamically adapt the frequency at which it sends these neighbor reports based on the characteristics of bearer traffic that the WCD has queued for transmission. For instance, the WCD may be configured by default to transmit neighbor reports at a particular default rate. Based on the characteristics of the queued bearer traffic, the WCD may adjust this rate.

For instance, in FIG. 4A, queued bearer traffic 400 includes three units of best effort (e.g., low priority) traffic between its head and tail. Further, the queue length of queued bearer traffic 400 is less than a queue length threshold. Possibly as a result of these characteristics, reverse-direction transmission schedule 402 indicates that the WCD should transmit two units of bearer traffic for each unit of neighbor reports.

In another example, queued bearer traffic 404 includes six units of best effort traffic between its head and tail. Thus, the queue length of queued bearer traffic 404 is greater than the queue length threshold. Possibly as a result of these characteristics, reverse-direction transmission schedule 406 indicates that the WCD should transmit three units of bearer traffic for each unit of neighbor reports. This may allow the bearer traffic to be transmitted frequently enough so that the queue length of queued bearer traffic 404 is reduced to less than the queue length threshold.

In still another example, FIG. 4B depicts queued bearer traffic 408 including one unit of best effort traffic, as well as three units of high-priority traffic, between its head and tail. Even though the queue length of queued bearer traffic 408 is less than the queue length threshold, it may be desirable for the WCD to transmit the high-priority traffic in an expeditious fashion. Thus, reverse-direction transmission schedule 410 indicates that the WCD should transmit four units of bearer traffic for each unit of neighbor reports. This may allow the bearer traffic to be transmitted frequently enough so that the high-priority traffic of queued bearer traffic 408 is transmitted with reasonably little interference from neighbor reports.

In yet another example, queued bearer traffic 412 includes two units of best effort traffic, two units of high-priority traffic, and two units of delay-sensitive traffic, between its head and tail. Also, the queue length of queued bearer traffic 412 exceeds the queue length threshold. Possibly as a result of these characteristics, reverse-direction transmission schedule 414 indicates that the WCD should transmit five units of bearer traffic for each unit of neighbor reports. This may allow the bearer traffic to be transmitted frequently enough so that the delay-sensitive bearer traffic is transmitted expeditiously, and the high-priority bearer traffic is transmitted with reasonably little interference from neighbor reports.

FIGS. 4A and 4B are merely examples of ways in which the frequencies of neighbor report transmissions may be based on one or more characteristics of queued bearer traffic. Other embodiments are possible. Thus, the reverse-direction transmission schedules may be based on the queue length of the queued bearer traffic, the type of the queued bearer traffic, or some combination thereof. For instance, delay-sensitive queued bearer traffic may result in the frequency of scheduled neighbor report transmissions being lower than those when high-priority bearer traffic is queued.

Further, the WCD may maintain the same frequency and schedule for various types of neighbor reports (e.g., ANR reports and measurement reports). However, in other embodiments, the WCD may maintain a different frequency and/or schedule for each type of neighbor report.

4. Example Operations

Figure 5:
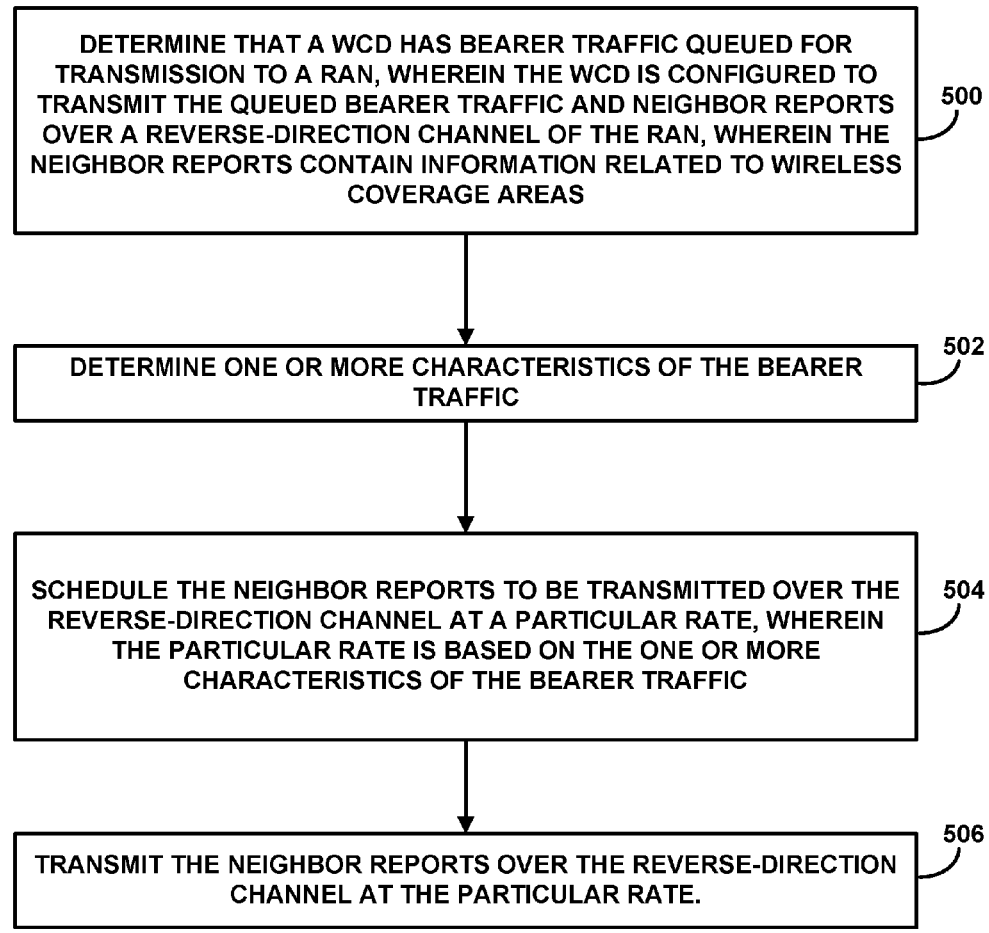
FIG. 5 is a flow chart, in accordance with an example embodiment.

FIG. 5 is a flow chart in accordance with an example embodiment. The operations of this flow chart may be carried out by a computing device, such as computing device 300.

At block 500, it may be determined that a WCD has bearer traffic queued for transmission to a RAN. The WCD may be configured to transmit the bearer traffic and neighbor reports over a reverse-direction channel of the RAN.

The neighbor reports may contain information related to wireless coverage areas. For instance, the neighbor reports may contain indications of one or more wireless coverage areas from which the WCD receives signals at or above a threshold signal strength. Alternatively or additionally, the neighbor reports may contain indications of strengths at which the WCD receives signals from one or more wireless coverage areas. The WCD may be configured by default to transmit the neighbor reports at a default rate.

At block 502, one or more characteristics of the queued bearer traffic may be determined. At block 504, the neighbor reports may be scheduled to be transmitted over the reverse-direction channel at a particular rate. The particular rate may be based on the one or more characteristics of the queued bearer traffic.

In some embodiments, the particular rate may be greater than the default rate. In other embodiments, the particular rate may be less than the default rate. When determining the one or more characteristics of the queued bearer traffic involves determining that a queue length of the bearer traffic exceeds a queue length threshold, the particular rate may be based on the queue length of the bearer traffic exceeding the queue length threshold. When determining the one or more characteristics of the queued bearer traffic involves determining that a priority of at least some of the bearer traffic exceeds a priority threshold, the particular rate may be based on the priority of at least some of the bearer traffic exceeding the priority threshold. When determining the one or more characteristics of the queued bearer traffic involves determining that a delay-sensitivity of at least some of the bearer traffic exceeds a delay-sensitivity threshold, the particular rate may be based on the delay-sensitivity of at least some of the bearer traffic exceeding a delay-sensitivity threshold.

At block 506, the neighbor reports may be transmitted over the reverse-direction channel at the particular rate. The reverse-direction channel may be an LTE uplink shared channel. However, the reverse-direction channel may be any other type of channel, such as a CDMA channel or a Wifi channel, for instance.

Although FIG. 5 illustrates operations that may be performed by a WCD to determine a schedule for transmission of neighbor reports, one or more of these operations may also be performed by a RAN component, or some other device, to determine the schedule. In such a case, the schedule may then be provided to the WCD. For instance, in some embodiments, a WCD may transmit, to a RAN component, a representation of its queued bearer traffic, and then block 502 and/or block 504 may be performed by a RAN component.

5. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   determining, at a wireless communication device (WCD), that the WCD has bearer traffic queued for transmission, wherein the WCD is configured to transmit the queued bearer traffic and neighbor reports over a reverse-direction channel of a radio access network;
   determining that a priority of at least some of the bearer traffic exceeds a priority threshold; and
   transmitting the neighbor reports over the reverse-direction channel at a particular rate, wherein the WCD is configured by default to transmit the neighbor reports at a default rate, and wherein the particular rate is less than the default rate and is based on the priority of at least some of the bearer traffic exceeding the priority threshold.

2. The method of claim 1, wherein the neighbor reports contain information related to wireless coverage areas.

3. The method of claim 2, wherein the neighbor reports contain indications of one or more wireless coverage areas from which the WCD receives signals at or above a threshold signal strength.

4. The method of claim 2, wherein the neighbor reports contain indications of strengths at which the WCD receives signals from one or more wireless coverage areas.

5. The method of claim 1, further comprising:
   determining that a delay-sensitivity of at least some of the bearer traffic exceeds a delay-sensitivity threshold, wherein the particular rate is also based on the delay-sensitivity of at least some of the bearer traffic exceeding the delay-sensitivity threshold.

6. The method of claim 1, further comprising:
   determining that a queue length of the bearer traffic exceeds a queue length threshold, wherein the particular rate is also based on the queue length of the bearer traffic exceeding the queue length threshold.

7. The method of claim 1, wherein the reverse-direction channel is an LTE uplink shared channel.

8. The method of claim 1, wherein the reverse-direction channel is a reverse-direction bearer channel.

9. An article of manufacture including a non-transitory computer-readable medium, having stored thereon program instructions that, upon execution by a wireless communication device (WCD), cause the WCD to perform operations comprising:
   determining that the WCD has bearer traffic queued for transmission, wherein the WCD is configured to transmit the queued bearer traffic and neighbor reports over a reverse-direction channel of a radio access network;
   determining that a priority of at least some of the bearer traffic exceeds a priority threshold; and
   transmitting the neighbor reports over the reverse-direction channel at a particular rate, wherein the WCD is configured by default to transmit the neighbor reports at a default rate, and wherein the particular rate is less than the default rate and is based on the priority of at least some of the bearer traffic exceeding the priority threshold.

10. The article of manufacture of claim 9, wherein the neighbor reports contain information related to wireless coverage areas.

11. The article of manufacture of claim 10, wherein the neighbor reports contain indications of one or more wireless coverage areas from which the WCD receives signals at or above a threshold signal strength.

12. The article of manufacture of claim 10, wherein the neighbor reports contain indications of strengths at which the WCD receives signals from one or more wireless coverage areas.

13. The article of manufacture of claim 9, the operations further comprising:
   determining that a delay-sensitivity of at least some of the bearer traffic exceeds a delay-sensitivity threshold, wherein the particular rate is also based on the delay-sensitivity of at least some of the bearer traffic exceeding the delay-sensitivity threshold.

14. The article of manufacture of claim 9, the operations further comprising:
   determining that a queue length of the bearer traffic exceeds a queue length threshold, wherein the particular rate is also based on the queue length of the bearer traffic exceeding the queue length threshold.

15. The article of manufacture of claim 9, wherein the reverse-direction channel is an LTE uplink shared channel.

16. The article of manufacture of claim 9, wherein the reverse-direction channel is a reverse-direction bearer channel.

17. A computing device comprising:
   at least one processor;
   data storage; and
   program instructions, stored in the data storage, that upon execution by the at least one processor cause the computing device to perform operations including:

determining that the computing device has bearer traffic queued for transmission, wherein the computing device is configured to transmit the queued bearer traffic and neighbor reports over a reverse-direction channel of a radio access network;

determining that a priority of at least some of the bearer traffic exceeds a priority threshold; and transmitting the neighbor reports over the reverse-direction channel at a particular rate, wherein the WCD is configured by default to transmit the neighbor reports at a default rate, and wherein the particular rate is less than the default rate and is based on the priority of at least some of the bearer traffic exceeding the priority threshold.

18. The computing device of claim 17, wherein the neighbor reports contain indications of one or more wireless coverage areas from which the computing device receives signals at or above a threshold signal strength.

19. The computing device of claim 17, the operations further including:

determining that a delay-sensitivity of at least some of the bearer traffic exceeds a delay-sensitivity threshold, wherein the particular rate is also based on the delay-sensitivity of at least some of the bearer traffic exceeding the delay-sensitivity threshold.

20. The computing device of claim 17, the operations further including:

determining that a queue length of the bearer traffic exceeds a queue length threshold, wherein the particular rate is also based on the queue length of the bearer traffic exceeding the queue length threshold.

* * * * *